United States Patent Office 3,203,842
Patented Aug. 31, 1965

3,203,842
LINEAR POLYESTER RESIN GAS-GENERATING COMPOSITIONS CONTAINING AMMONIUM NITRATE AND PERCHLORATE
John N. Godfrey, Alexandria, Va., assignor to Atlantic Research Corporation, Fairfax County, Va., a corporation of Virginia
No Drawing. Filed Sept. 9, 1963, Ser. No. 307,311
15 Claims. (Cl. 149—19)

This invention relates to gas-generating compositions and grains fabricated from these compositions. More particularly it relates to such compositions and grains which burn at a low flame temperature.

Gas-generating materials having various compositions are known in the art. These compositions include primarily an oxidizing component and a binder along with other additives such as plasticizers, burning rate catalysts, etc. Ideally, these compositions possess specific desirable characteristics such as low flame temperature and minimum amounts of corrosive products and solid particles in the gas stream produced during the burning of the gas-generating material. These characteristics prevent damage to the orifices, valves, supply lines, storage tanks and other equipment used with the gas-generating compositions resulting from exposure to high temperatures, corrosion, and clogging.

Among the gas-generating compositions heretofore most widely used were those employing ammonium nitrate as the oxidizer. The ammonium nitrate produces a low flame temperature and by itself produces a low solids content in the generated gas stream. However, except in very high concentrations, the presence of ammonium nitrate causes serious difficulties in ignition and prevents sustained burning of the composition at low chamber pressures and/or low ambient grain temperatures. In an attempt to obviate such difficulties the proportion of ammonium nitrate has been increased considerably. When such high loadings of ammonium nitrate sufficient to impart acceptable burning characteristics to the composition are employed, the composition could not be cast due to the insufficient amount of binder present to hold the oxidizer particles together. Burning rate catalysts have also been added to the ammonium nitrate compositions to enhance ignition and sustained burning characteristics. Unfortunately, a burning rate catalyst generally produces undesirable solids in the gas stream which tend to clog orifices, valves, and supply lines.

Some difficulties have also been experienced with the thermal cycling or solid gas-generating grains containing ammonium nitrate as the sole oxidizing component. When these grains are subjected to repeated changes in temperature, the ammonium nitrate experiences phase changes which cause an excessively great "growth rate," resulting in expansion of the grain. This produces undue internal stresses within the grain resulting in fissures, cracks, separation from inhibitors, and other defects as well as decreasing the free volume of the container enclosing the grain which causes undesirable ignition difficulties.

Many of the binders heretofore employed in castable gas-generating compositions are rubbery polymers, e.g., polybutadiene-acrylic acid copolymers. Since these compositions are difficult to cast and burn with an excessively high flame temperature, it has been necessary to add oxygenated plasticizers such as ethylene glycol bis methyl carbonate to correct these problems. However, the oxygenated plasticizers themselves often create the additional problem of inhibiting the curing and decreasing the strength of the rubbery polymer.

Accordingly, it is an object of this invention to provide a new and improved gas-generating composition having a low flame temperature.

Another object of this invention provides a gas-generating composition which can be easily and readily cast.

Still another object is to provide a gas-generating grain which can withstand repeated thermal cycling.

Other objects, features and advantages of my invention will become apparent from the following detailed description.

In general, the compositions according to my invention comprise an intimate, homogeneous mixture of two finely divided oxidizers, ammonium nitrate and ammonium perchlorate, uniformly distributed in a particular type of fuel binder, namely, a cured saturated polyester resin.

I have discovered that the utilization of these compositions, having the aforementioned ingredients present in certain specific ranges of proportions, in gas-generating grains greatly improves their castibility, ballistic characteristics, and physical properties. The compositions comprise between about 60% to about 70% by weight of the oxidizer combination based on the total weight of the oxidizers and binder and correspondingly between about 40% to about 30% of the cured saturated polyester resin binder. The oxidizer portion, itself, comprises between about 10% to about 30% ammonium perchlorate and between about 60% to about 40% ammonium nitrate, each percentage being based upon the combined weight of the oxidizers and the resin binder.

Gas-generating compositions containing these particular component proportions retain the required low flame temperatures and exhibit the excellent ballistic characteristics necessary for easy and quick ignition and sustained even burning. Since these compositions do not require a burning rate catalyst in order to sustain even burning, the undesirable solid contaminants generally resulting from their presence are eliminated. The use of the two oxidizers in these particular proportions also permits the inclusion of sufficient resin binder for good castibility.

The physical properties of such gas-generating grains are very considerably improved over grains containing ammonium nitrate in larger proportions. This is especially apparent when the grains are subjected to repeated thermal cycling, that is, alternate heating and cooling, over a wide temperature range. The growth rate and consequent undesirable expansion of the grain are minimized by the use of the specified range of ammonium perchlorate. This decreases any undue internal stresses which can cause fissures, cracks, inhibitor separation, etc., resulting in unsatisfactory performance. Within the specified ranges it is obvious that the proportions of each component can be varied depending upon the requirements of each individual use of the compositions.

As aforementioned, it is essential that the gas-generating compositions contain the oxidizer and binder components in the specified ranges of proportions. If less than about 10% of ammonium perchlorate is present, irregular burning and difficulties in ignition result. If sufficient ammonium nitrate were used to sustain adequate burning and permit easy ignition, casting of the composition would be extremely difficult because of an insufficient amount of cured resin present to bind together the particles of finely divided oxidizer. If the amount of ammonium perchlorate is increased above about 30%, the flame temperature rises sufficiently to damage the apparatus in which the gas is generated and stored. The use of proportions of the cured saturated polyester binder above the specified range results in undesirable amounts of solids which can clog orifices, valves, supply lines, etc., in the gas-generating apparatus. Amounts of the binder below the specified range cause casting difficulties.

The saturated polyester resins employed as binders for the gas-generating grains are liquid, substantially linear, carboxyl terminated polymers having an average of between about 2 and about 3, preferably about 2.5, carboxyl groups per molecule. The term, saturated, means the resin is free from ethylenic unsaturation through which the polyester might polymerize. These resins, also referred to as alkyd resins, are the reaction products of a saturated aliphatic polycarboxylic acid component and a saturated polyhydric alcohol component. The polyester is formed by the reaction of the hydroxy groups of the polyhydric alcohol with the carboxyl groups of the polycarboxylic acid. Sufficient polyhydric alcohols having at least three reactive hydroxyl groups, e.g., trihydric alcohols, are reacted with the polycarboxylic acid to provide the required average of from about 2 to about 3 carboxyl groups per molecule of the polyester resin.

These polyester resins are particularly advantageous because of the large amount, e.g., about 37% by weight, of oxygen contained within the polymer. The oxygen in the resin binder, itself, obviates the necessity to include in the composition an oxygenated plasticizer, e.g., ethylene glycol bis methyl carbonate, which heretofore was required for processing and lowering the temperature of binders such as polybutadiene copolymers, but which also inhibited the cure and decreased the strength of these polymers.

The saturated aliphatic polycarboxylic acids which can be employed in the polyester resins are, for example, the aliphatic, dicarboxylic acids such as oxalic, malonic, succinic, glutaric, adipic, pimelic, sebacic, azelaic, and the like. The saturated anhydrides of these acids, e.g., succinic anhydride, can also be employed. If desired, mixtures of the acids, anhydrides, or both can be used.

The saturated polyhydric alcohol component comprises a mixture of a dihydric alcohol such as ethylene glycol, diethylene glycol, triethylene glycol, propylene glycol, trimethylene glycol and the like, and a polyhydric alcohol having at least three hydroxyl groups, for example, trihydric alcohols such as glycerol, tetrahydric alcohols such as the erythritols and pentaerythritol, pentahydric alcohols such as arabitol, adonitol, and xylitol, hexahydric alcohols such as mannitol and sorbitol and heptahydric alcohols such as persitol and volamitol, etc. The dihydric alcohols provide the major proportion of the alcohol component as aforementioned, the higher polyhydric alcohols being present only in amounts sufficient to provide enough reactive sites for the dicarboxylic acid to impart an average of between about 2 and about 3 carboxyl groups per molecule to the polyester resin.

Particularly preferred polyester resins are those made by reacting adipic acid with a mixture of a glycol such as ethylene glycol or a polyethylene glycol, e.g., diethylene glycol, and a polyhydric alcohol having 3 or more hydroxyl groups such as pentaerythritol or glycerol.

The curing agents used with the polyester resins can be any suitable material or mixture of materials which reacts with the carboxyl groups of the substantially linear liquid polyesters to form the hardened binder for the oxidizer component. Exemplary of these curing agents are di- and tri-functional imine and di- and tri-functional epoxy compounds which react with the carboxyl groups of the liquid polyesters to form a suitable cross-linked polymer binder. The functionality, e.g., trifunctional, refers to the number of groups, e.g., imine or epoxy, present which react with the carboxyl groups. Particularly preferred are compounds such as a trifunctional epoxy of the formula

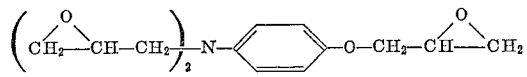

or a trifunctional imine such as tris [1-(2-methyl)-aziridinyl] phosphine oxide or mixtures thereof.

Any suitable method can be employed in preparing the gas-generating compositions of my invention. The ingredients in the particular specified ranges can be mixed together in any sequence using processing techniques well known to the technician to control the consistency, homogeneity, etc., of the mixture. For example, the ammonium perchlorate and ammonium nitrate can be added to the liquid polyester resin. Minor amounts of a suitable dispersing agent can then be added and the ingredients can be mixed until homogeneous. The resulting composition can then be fabricated into a solid gas-generating grain by adding a suitable curing agent, thoroughly mixing until the curing agent is homogeneously distributed throughout and finally molding, casting, etc., to any desired configuration. Preferably the composition is heated above ambient temperature to accelerate the cure.

The following specific examples are included as illustrative only of typical gas-generating formulations according to the invention.

Example I

Gas-generating grains having the following composition were fabricated by first mixing the ingredients in a vertical mixer until they were substantially homogeneous. The mixture was then deaerated, poured into the preformed molds and cured at 160° F. to form the final grain product. The grains were ignited and flame temperatures and ballistic properties were determined.

| Composition | Percent by Weight | | |
|---|---|---|---|
| | A | B | C |
| Ammonium nitrate | 55.65 | 45.50 | 36.40 |
| Ammonium perchlorate | 10.00 | 21.00 | 30.00 |
| Propylene carbonate | 5.15 | | |
| Saturated polyester resin [1] | 21.60 | 25.12 | 25.04 |
| Curing agent [2] | 7.60 | 8.17 | 8.35 |
| Wetting agent [3] | | 0.20 | 0.20 |
| Carbon black | | 0.01 | 0.01 |
| Flame temperature, ° F | 1,863 | 1,988 | 2,198 |
| Mol. wt. of gas | 19.7 | 19.8 | 20.2 |
| Pressure exponent: | | | |
| 550 p.s.i.a. | .56 | .54 | .51 |
| 2,500 p.s.i.a. | .56 | .43 | .53 |
| Density (lb./in.³) | .055 | .055 | .054 |

[1] Reaction product of adipic acid, diethylene glycol, and glycerol having an average of about 2.5 carboxyl groups per molecule.

[2] 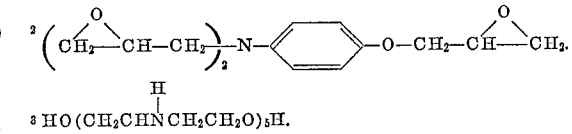

[3] $HO(CH_2CHNCH_2CH_2O)_5H$.

Example II

After repeated and identical temperature cycling over the range of −65° F. to 165° F. a comparison of grain growth between the polyester binder formulation B of Example I and a gas-generating composition having a polybutadiene-acrylic acid copolymer binder and an ammonium nitrate oxidizer and referred to as formulation D is summarized as follows:

| | Composition | |
|---|---|---|
| | B | D |
| Grain length (in.) | 0.5 | 2.9 |
| Grain diameter (in.) | 3.8 | 2.2 |
| Grain volume (in.³) | 6.0 | 11.0 |
| Percent volume increase: | | |
| 13 cycles | 2.0 | 5.1 |
| 20 cycles | 2.8 | 8.6 |
| 29 cycles | 3.4 | |

This data shows the composition containing both ammonium perchlorate and ammonium nitrate is relatively insensitive to repeated thermal cycling while the growth rate of the formulation having only ammonium nitrate is relatively large.

The gas-generating compositions described above are suitable for applications such as thrust vector control, roll control, pressurizing rockets, buoying torpedoes with gas-filled compartments, etc, namely, where relatively low temperatures are required and specific impulse is not important. My compositions are particularly advantageous because of their insensitivity to changes in temperature and consequently can withstand extremes of temperature in various locales and at various altitudes without undergoing any harmful changes. The low specific impulse and low density of the formulations make them unsuitable for use as propellants in rockets requiring substantial thrust.

As will be apparent to those skilled in the art, various other modifications can be carried out from the above disclosure without departing from the spirit and scope of the invention embodied within the claims.

I claim:

1. A gas-generating composition comprising between about 60% and about 70% of an oxidizer component and correspondingly between about 40% and about 30% of a binder component, said oxidizer component consisting essentially of between about 10% and about 30% ammonium perchlorate and correspondingly between about 60% and about 40% ammonium nitrate, each of the said percentages being based upon the total weight of said oxidizer component and said binder component, said binder component comprising a cured, substantially linear saturated polyester resin having an average of between about 2 and about 3 carboxyl groups per molecule, wherein said polyester is the reaction product of an acid component and a saturated alcohol component, said acid component being a member selected from the group consisting of saturated aliphatic polycarboxylic acid, its anhydride, and mixtures thereof, said alcohol component being a mixture of saturated dihydric alcohol and saturated polyhydric alcohol having at least three reactive hydroxyl groups.

2. The composition of claim 1 in which the polyester resin has an average of about 2.5 carboxyl groups per molecule.

3. The composition of claim 1 in which said polycarboxylic acid is saturated, aliphatic, dicarboxylic acid.

4. The composition of claim 3 in which the polyester resin has an average of about 2.5 carboxyl groups per molecule.

5. The composition of claim 3 in which the polyester resin is cured with a compound selected from the group consisting of difunctional imines, trifunctional imines, difunctional epoxies and trifunctional epoxies and mixtures thereof.

6. The composition of claim 5 in which the curing agent is a compound having the formula

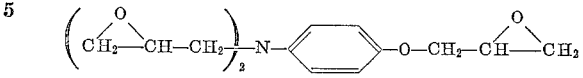

7. The composition of claim 5 in which the curing agent is tris [1-(2-methyl) aziridinyl] phosphine oxide.

8. The composition of claim 3 in which the saturated acid component is adipic acid.

9. The composition of claim 3 in which the dihydric alcohol is selected from the group consisting of ethylene glycol, diethylene glycol, triethylene glycol and trimethylene glycol.

10. The composition of claim 9 in which the dihydric alcohol is diethylene glycol.

11. The composition of claim 3 in which the polyhydric alcohol having at least three reactive hydroxyl groups is selected from the group consisting of glycerol and pentaerythritol.

12. The composition of claim 11 in which the polyhydric alcohol is glycerol.

13. The composition of claim 11 in which the polyhydric alcohol is pentaerythritol.

14. The composition of claim 11 in which the dicarboxylic acid is adipic acid and the dihydric alcohol is diethylene glycol.

15. The composition of claim 12 in which the dicarboxylic acid is adipic acid and the dihydric alcohol is diethylene glycol.

References Cited by the Examiner

UNITED STATES PATENTS

| | | | |
|---|---|---|---|
| 3,000,715 | 9/61 | Lawrence | 149—19 |
| 3,031,288 | 4/62 | Roy | 149—19 |
| 3,087,844 | 4/63 | Hudson et al. | 149—19 |
| 3,130,096 | 4/64 | Pruitt et al. | 149—19 |
| 3,147,161 | 9/64 | Abere et al. | 149—19 |

CARL D. QUARFORTH, *Primary Examiner.*